United States Patent [19]
Bracey

[11] 3,903,636
[45] Sept. 9, 1975

[54] OXYGENATION SYSTEM

[76] Inventor: Jep T. Bracey, 1324 Beckham Ave., Rm. 125, Tyler, Tex. 75701

[22] Filed: Aug. 2, 1973

[21] Appl. No.: 385,056

Related U.S. Application Data

[63] Continuation of Ser. No. 202,839, Nov. 29, 1971, abandoned.

[52] U.S. Cl. ................................................ 43/56
[51] Int. Cl.² ........................................ A01K 97/04
[58] Field of Search ............ 43/55, 56, 57; 119/3, 5; 261/121

[56] References Cited
UNITED STATES PATENTS

| | | | |
|---|---|---|---|
| 2,008,369 | 7/1935 | Staley | 43/57 |
| 2,341,246 | 2/1944 | Stowe | 43/56 |
| 2,489,818 | 11/1949 | Roe | 43/57 |
| 2,761,239 | 9/1956 | Stamps | 43/56 |
| 2,949,691 | 8/1960 | Johnson | 43/55 |
| 3,136,087 | 6/1964 | Scroggins | 43/57 |
| 3,320,928 | 5/1967 | Smith | 119/3 |
| 3,339,305 | 9/1967 | Smith | 43/56 |
| 3,348,330 | 10/1967 | Gilliam | 43/57 |
| 3,449,855 | 6/1969 | Hassell | 43/56 |

FOREIGN PATENTS OR APPLICATIONS

| | | | |
|---|---|---|---|
| 658,248 | 2/1963 | Canada | 43/56 |

*Primary Examiner*—Warner H. Camp
*Attorney, Agent, or Firm*—Richards, Harris & Medlock

[57] ABSTRACT

An oxygenation system comprises an open-bottomed container positioned within a quantity of water for receiving a quantity of oxygen and thereby forming an oxygen-water interface beneath the surface of the quantity of water. In accordance with one embodiment of the invention the open-bottomed container is mounted within an open-topped container to form a live bait bucket and is arranged to permit the withdrawal of live bait from the bucket while maintaining the oxygen-water interface. In accordance with another embodiment of the invention the open-bottomed container is positioned beneath the thermocline in a lake or similar large body of water and functions to dissolve additional oxygen into the layer of the large body of water located just below the thermocline.

10 Claims, 3 Drawing Figures

INVENTOR:
JEP T. BRACEY

Richards, Harris & Hubbard
ATTORNEYS

OXYGENATION SYSTEM

This is a continuation of application Ser. No. 202,839, filed Nov. 29, 1971, now abandoned.

BACKGROUND AND SUMMARY OF THE INVENTION

This invention relates to oxygenation systems, and more particularly to systems for maintaining dissolved oxygen in water and thereby increasing the longevity of fish, etc. living in the water.

At the present time live bait, i.e., minnows, etc., is sold in small plastic bags. Typically a small quantity of water containing live bait is initially deposited in a bag. The remainder of the bag is then filled with oxygen and the bag is sealed.

The foregoing technique is satisfactory insofar as the transportation of live bait from a bait store to a fishing site is concerned. However, in order to remove bait from the bag for fishing purposes, it is necessary to break the seal of the bag, whereupon the oxygen escapes from the bag. Thereafter it is necessary to transfer the live bait to another container since the bait cannot live in the small quantity of water in the bag unless the concentration of dissolved oxygen in the water is maintained at an adequate level.

At the present time live bait is typically transferred to a conventional bait bucket. Such a device comprises an outer bucket formed from metal or plastic which is filled with water. An inner perforated bucket is normally mounted within the outer bucket and receives the live bait. The inner bucket is adapted for transfer to the water of a lake, etc., in order to provide the live bait with water having a continuous supply of dissolved oxygen. By this means it is possible to keep the bait alive for an extended period of time.

The co-pending application of Jep T. Bracey, filed July 13, 1970, Ser. No. 354,425, now U.S. Pat. No. 3,710,502 and entitled "Live Bait Bucket with Water Oxygenating Means" comprises an improved live bait bucket which is similar to the conventional bucket in that it comprises and outer imperforate water receiving bucket and an inner live bait receiving bucket having perforations formed therethrough. The bait bucket comprising the prior Bracey invention differs from conventional buckets, however, in that it includes means for maintaining a supply of oxygen in the upper portions of the outer and inner buckets. By this means bait can live within the bucket for an extended period of time without the necessity of transferring the inner perforated bucket to the water of a lake, etc.

One difficulty that has been experienced in the use of the prior Bracey bait bucket is that it is impossible to maintain oxygen within the bait bucket during the removal of live bait therefrom. That is, if the bucket is opened to permit withdrawal of live bait, for example for fishing purposes, the oxygen from the upper portion of the bucket is lost. The prior Bracey live bait bucket contains an oxygen reservoir whereby it is possible to renew the supply of oxygen in the upper portion of the bucket. It will be appreciated however that a certain inconvenience is encountered in the use of the prior Bracey invention due to the necessity of repeatedly opening the bucket to remove the live bait, closing the bucket and re-establishing oxygen within the bucket.

The present invention comprises an improved oxygenation system and more particularly a system for maintaining a high concentration of dissolved oxygen in a body of water. In accordance with the broader aspects of the invention, an oxygen-water interface is continuously maintained below the surface of a body of water. By this means oxygen is constantly dissolved in the water so that the longevity of fish, etc. living in the water is markedly increased.

More particularly, in accordance with one embodiment of the invention a live bait bucket comprises an outer, open-topped container which receives a quantity of water containing live bait. A second, open-bottomed container is mounted within the first container at a point beneath the surface of the water therein. A quantity of oxygen is admitted to the second container so that an oxygen-water interface is continuously maintained within the first container. By this means access is provided to the live bait in the bucket and yet the period of time that bait can live in the container is increased by a considerable margin.

In accordance with another embodiment of the invention, an open-bottomed container is positioned beneath the thermocline of a lake, pond, or the like. A supply of oxygen is maintained in the container whereby an oxygen-water interface is continuously maintained beneath the thermocline. This results in increased oxygen concentration below the thermocline which in turn permits a greatly increased number of fish to live in the lake, etc.

DESCRIPTION OF THE DRAWING

A more complete understanding of the invention may be had by referring to the following detailed description when taken in conjunction with the accompanying drawing, wherein.

DETAILED DESCRIPTION

Figure 1:
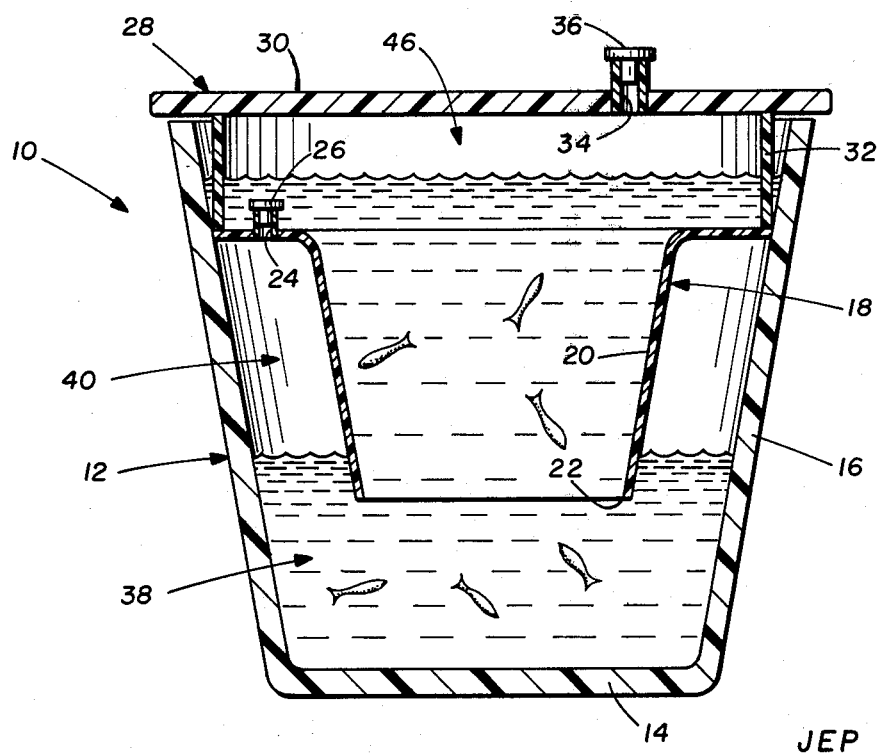
FIG. 1 is a sectional view of a live bait bucket comprising a first embodiment of the invention.

Referring now to the drawing, and particularly to FIG. 1 thereof, there is shown a live bait bucket 10 comprising a first embodiment of the present invention. The live bait bucket 10 includes a water reservoir 12 comprising an outer opentopped container which is preferably formed from a thermally insulative material. The water reservoir 12 includes a circular bottom 14 and a cylindrical side wall 16 formed integrally with the bottom 14 and extending upwardly therefrom.

A first oxygen reservoir 18 comprising an inner open-bottomed container is supported within the water reservoir 12 at a point midway between the upper and lower ends of the side wall 16. The first oxygen reservoir 18 comprises an annular wall 20 which is secured to the inner surface of the wall 16 and which extends inwardly and downwardly to an edge 22. The first oxygen reservoir 18 is provided with an outlet 24 which is normally closed by a stopper 26.

The live bait bucket 10 is completed by a second oxygen reservoir 28 which also serves as a lid for the water reservoir 12. The second oxygen reservoir 28 includes an upper circular member 30 which is preferably formed from a thermally insulative material and an annular member 32 which extends downwardly from the member 30 to form an open-bottomed container. The second reservoir 28 is provided with an outlet 34 which is normally sealed by a stopper 36.

Figure 2A:
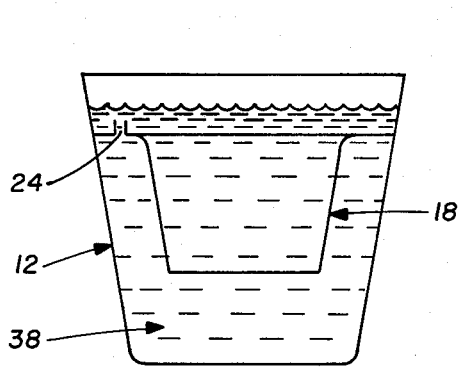
FIGS. 2a, 2b, and 2c are illustrations of progressive steps in the use of the live bait bucket shown in FIG. 1.
Figure 2B:
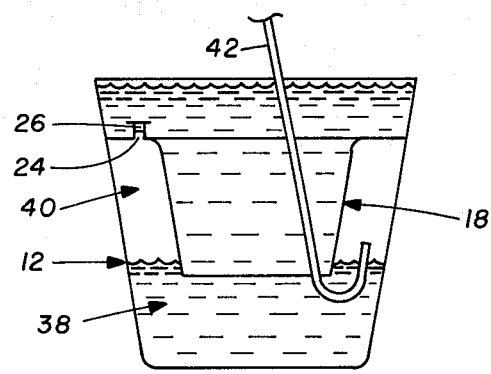
Figure 2C:
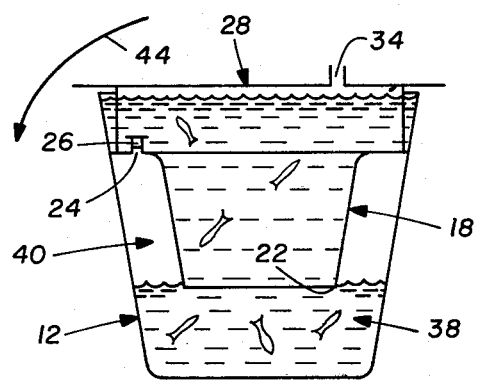

The use of the live bait bucket 10 is illustrated in FIGS. 2a, 2b, and 2c. Both the second oxygen reservoir 28 and the stopper 26 are initially removed. A quantity of water 38 is then admitted to the water reservoir 12. Since the outlet 24 is open, air is free to flow out of the first oxygen reservoir 18. Thus, both the oxygen reservoir 18 and the water reservoir 12 are initially filled with water, the latter to a predetermined depth. It should be realized that live bait can be deposited in the water reservoir 12 with the quantity of water 38, if desired.

After the quantity of water 38 has been fed into the water reservoir 12, the stopper 26 is employed to close the outlet 24 in the first oxygen reservoir 18. Then a quantity of oxygen 40 is admitted to the first oxygen reservoir 18, preferably by means of a hook-shaped oxygen supply tube 42. As the quantity of oxygen 40 fills the first oxygen reservoir 18, water is displaced therefrom whereby the depth of the water in the water reservoir 12 is increased until the water reservoir 12 is completely full. At this point live bait is admitted to the live bait bucket 10. Of course, the latter step is unnecessary if live bait was admitted to the bucket 10 with the quantity of water 38.

When the live bait has been admitted to the live bait bucket 10, the second oxygen reservoir 28 is positioned in the top of the water reservoir 12. This is preferably accomplished with the stopper 36 removed so that air is free to flow out of the outlet 34. Stopper 36 is then replaced in outlet 34. Thereafter the live bait bucket 10 is tipped slightly as indicated by the arrow 44 so that a portion of the quantity of oxygen 40 flows around the lower edge 22 and upwardly into the second oxygen reservoir 28. At this point the live bait bucket 10 is in the condition shown in FIG. 1 in that it contains both the original quantity of oxygen 40 and a quantity of oxygen 46 located at the surface of the quantity of water 38 in the water reservoir 12.

The condition of the live bait bucket 10 illustrated in FIG. 1 is particularly useful for transporting live bait from a bait store to a fishing site. This is because the use of the second oxygen reservoir 28 not only provides a second oxygen-water interface for the live bait bucket but also helps to prevent excessive heating of the water in the bucket. At the fishing site the stopper 36 is removed and the second reservoir 28 is thereafter withdrawn to provide access to the live bait in the water reservoir 12. The lower edge 22 of the first oxygen reservoir 18 is preferably provided with an aperture of sufficient size to permit the insertion of a human hand to the full depth of the water reservoir 12. By this means the present invention functions to permit access to the live bait and at the same time maintains an oxygen-water interface beneath the surface of the water whereby oxygen is continually dissolved in the water to maintain the live bait in a healthy and vigorous condition.

It will be understood that when the second oxygen reservoir 28 is in use, a first oxygen-water interface is maintained at a point beneath the surface of the water in the live bait bucket and a second oxygen-water interface is maintained at the surface of the water. By this means oxygen is continually dissolved in the water so that the longevity of bait living in the water is increased to a marked extent. For example, it has been found that a conventional bait bucket is capable of keeping a quantity of 48 minnows alive for a period of about 1 hour if it is positioned in the shade and for a period of about 20 minutes if it is positioned in the sun. On the other hand, when the present invention is employed the same size bucket is capable of keeping a quantity of 48 minnows alive for a period of 7 hours if it is positioned in the sun and for a period of 3 to 4 days if it is positioned in the shade. Thus, the use of the present invention is extremely useful in increasing the longevity of live bait.

The present invention further includes a second embodiment which comprises a system for maintaining an oxygen-water interface beneath the thermocline in a lake, pond, or the like. As is well known, the water beneath the thermocline of a lake, etc. is oxygen-poor and therefore cannot support as many fish as would be the case if it were oxygen-rich. It has been found that by maintaining an oxygen-water interface beneath the thermocline the oxygen concentration in the layer of water beneath the thermocline can be increased to such an extent that the number of fish that can live in the lake, etc. is increased to a marked degree. This is particularly important in the case of fish farms because it increases the quantity of fish that can be harvested from a lake or pond of a given size.

More specifically, in accordance with the second embodiment of the invention an open-bottomed container is positioned beneath the thermocline in a body of water such as a lake, etc. Oxygen is supplied to the open-bottomed container through a suitable conduit, and the amount of oxygen in the open-bottomed container is controlled by a float operated valve. By this means an oxygen-water interface is maintained beneath the thermocline of the body of water which in turn causes oxygen to dissolve into the layer of water beneath the thermocline on a continuous basis. The presence of additional dissolved oxygen in the layer of water beneath the thermocline permits fish to live in this layer which would not be possible if the layer were in its normal oxygen-poor condition.

From the foregoing it will be understood that in the use of the present invention an oxygen-water interface is maintained beneath the surface of a quantity of water. By this means oxygen is continuously dissolved into the water so that the oxygen concentration in the water is maintained at a sufficiently high level to permit fish to live in the water. In accordance with one embodiment of the invention the oxygen-water interface is maintained beneath the surface of a quantity of water in a live bait bucket and functions to markedly increase the longevity of the bait. In accordance with another embodiment of the invention the oxygen-water interface is maintained beneath the thermocline in a lake or pond and functions to markedly increase the number of fish that can live in the lake, etc.

Although preferred embodiments of the invention have been illustrated in the Drawing and described in the foregoing Detailed Description, it will be understood that the invention is not limited to the embodiments disclosed, but is capable of rearrangement, modification, and substitution of parts and elements without departing from the spirit of the invention.

What is claimed is:

1. A method of increasing the concentration of oxygen in a body of water comprising providing a quantity of oxygen in an open-bottomed container positioned within and substantially below the top of a container which is filled with water to such a depth that the surface of the water is located above the top of the open-bottomed container and thereby maintaining an oxygen-water interface at a point substantially below the surface of the water; and further characterized by positioning a second open-bottomed container on top of the water-filled container while simultaneously exhausting the air therefrom and subsequently receiving a portion of the oxygen from the first open-bottomed container in the second open-bottomed container and thereby maintaining a second oxygen-water interface at the surface of the water.

2. A method of increasing the concentration of oxygen in a body of water comprising providing a quantity of water in a relatively large, open-topped container and providing a quantity of oxygen in a relatively small, open-bottomed container located within the water receiving container and having a top located substantially beneath the surface of the quantity of water therein and thereby maintaining an oxygen-water interface at a point below the surface of the water in the large container wherein the oxygen receiving step is further characterized by initially filling both the large and the small containers with water while simultaneously exhausting air from the small container, and subsequently receiving oxygen in the small container and thereby displacing the water from the small container.

3. A method of increasing the concentration of oxygen in a body of water comprising providing a quantity of water in a relatively large, open-topped container and providing a quantity of oxygen in a relatively small, open-bottomed container located within the water receiving container and having a top located substantially beneath the surface of the quantity of water therein and thereby maintaining an oxygen-water interface at a point below the surface of the water in the large container and further including the subsequent steps of positioning a second open-bottomed container on top of the large water receiving container while simultaneously exhausting the air therefrom and thereafter receiving part of the oxygen from the relatively small container in the second open-bottomed container and thereby maintaining a second oxygen-water interface at the surface of the water in the large container.

4. A method of increasing the concentration of oxygen in a body of water comprising providing a quantity of oxygen in a first open-bottomed container positioned within and substantially below the top of a container which is substantially filled with water and thereby maintaining an oxygen-water interface at a point substantially below the surface of the water, positioning a second open-bottomed container on top of the water filled container while simultaneously exhausting the air therefrom, and directing a portion of the oxygen from the first open-bottomed container into the second open-bottomed container and thereby maintaining a second oxygen-water interface at the surface of the water.

5. A live bait storage system comprising:
a relatively large, open-topped container for receiving water to a predetermined depth adjacent the top thereof; and
a relatively small, open-bottomed container mounted within the open-topped container and positioned substantially beneath the top thereof for receiving oxygen and thereby forming an oxygen-water interface at a point below the surface of the water in the open-topped container.

said open-bottomed oxygen receiving container including normally closed outlet means formed in the top thereof to permit air flow outwardly therefrom as the open-topped container is filled with water; and
a second open-bottomed container comprising a top for the open-topped container;
said second open-bottomed container having normally closed outlet means formed therein to permit air flow outwardly therefrom as it is engaged with the open-topped container.

6. A live bait storage system comprising:
an open-topped container for receiving water to a predetermined depth;
a first open-bottomed container mounted within the open-topped container and having a top positioned substantially beneath the top of the open-topped container for receiving oxygen and thereby forming an oxygen-water interface at a point below the surface of the water in the open-topped container;
a normally closed outlet means formed in the upper portion of the first open-bottomed container to permit air flow outwardly therefrom as the open-topped container is filled with water; and
a top for the open-topped container comprising a second open-bottomed container for receiving oxygen to maintain a second oxygen-water interface at the surface of the water in the open-topped container.

7. A live bait bucket comprising:
a water reservoir comprising a circular bottom wall and a cylindrical side wall extending upwardly therefrom to an open top;
an oxygen reservoir comprising an annular wall secured to the side wall of the water reservoir and extending inwardly and downwardly therefrom to an open bottom;
said water reservoir for receiving a quantity of water to a predetermined depth above the open bottom of the oxygen reservoir,
said oxygen reservoir having normally closed outlet means for permitting air flow outwardly therefrom as the water reservoir is filled with water;
said oxygen reservoir for thereafter receiving a quantity of oxygen and thereby forming an oxygen-water interface at a point beneath the surface of the water in the water reservoir; and
a top for the water reservoir comprising a circular top wall and an annular wall extending downwardly therefrom to an open bottom;
said circular wall of the top having normally closed outlet means for permitting air flow outwardly therefrom as the top is engaged with the water reservoir;
said top forming a second oxygen reservoir for receiving a quantity of oxygen and thereby forming an oxygen-water interface at the surface of the water in the water reservoir.

8. The live bait bucket according to claim 7 wherein the bottom and side walls of the water reservoir and the circular wall of the top are formed from a thermally insulative material.

9. The live bait bucket according to claim 8 wherein the wall defining the oxygen reservoir extends to a circular lower edge having sufficient diameter to permit withdrawal of live bait from the water reservoir while maintaining an oxygen-water interface within the oxygen reservoir.

10. For use in conjunction with a body of water having a surface, apparatus comprising a circular planar top wall formed from plastic foam and a single imperforate annular wall depending vertically from adjacent the periphery of the top wall to an open bottom and adapted for positioning beneath the surface of the water, said top wall comprising a unitary, substantially imperforate member enclosing the entire upper edge of the annular wall and having normally closed outlet means formed therein for permitting air flow out of the space enclosed by the annular wall and thereby permitting the open bottom thereof to fill with water.

* * * * *